April 14, 1925.

H. M. BATER ET AL 1,533,365

TRUNK RACK BRACKET

Filed May 1, 1924

Inventors:
Harold W. Bater,
Clarence H. Glentworth,
by their attorney, Charles S. Gooding.

Patented Apr. 14, 1925.

1,533,365

UNITED STATES PATENT OFFICE.

HAROLD M. BATER AND CLARENCE A. GLENTWORTH, OF MANCHESTER, MASSACHUSETTS.

TRUNK-RACK BRACKET.

Application filed May 1, 1924. Serial No. 710,268.

*To all whom it may concern:*

Be it known that we, HAROLD M. BATER, a subject of King George V of England, and CLARENCE A. GLENTWORTH, a citizen of the United States, residing at Manchester, in the county of Essex and State of Massachusetts, have invented new and useful Improvements in Trunk-Rack Brackets, of which the following is a specification.

This invention relates to an improved trunk rack bracket and to a trunk rack comprising two of said brackets fastened together by a platform member.

The object of the invention is to provide a trunk rack bracket which can be mounted upon the rear end of a chassis and fastened to the chassis by fastening means already forming a portion of the automobile, of which said chassis is a part.

The trunk rack brackets of this invention are particularly adapted to be used in connection with an Essex automobile and they are so constructed that they may be positioned upon the rear end of the chassis of the automobile and attached thereto by bolts, already in use on said automobile for other purposes, so that the brackets can be attached to the chassis of the Essex automobile without drilling any holes and without adding any parts, other than the brackets and the platform member, which together form the improved trunk rack of this invention.

The invention consists in a trunk rack bracket of the construction hereinafter set forth in the specification and particularly pointed out in the claims, and also in a trunk rack formed by a pair of said brackets and fastened together by means of a platform member.

Referring to the drawings.

Like numerals refer to like parts in the figures of the drawings.

Figure 1:
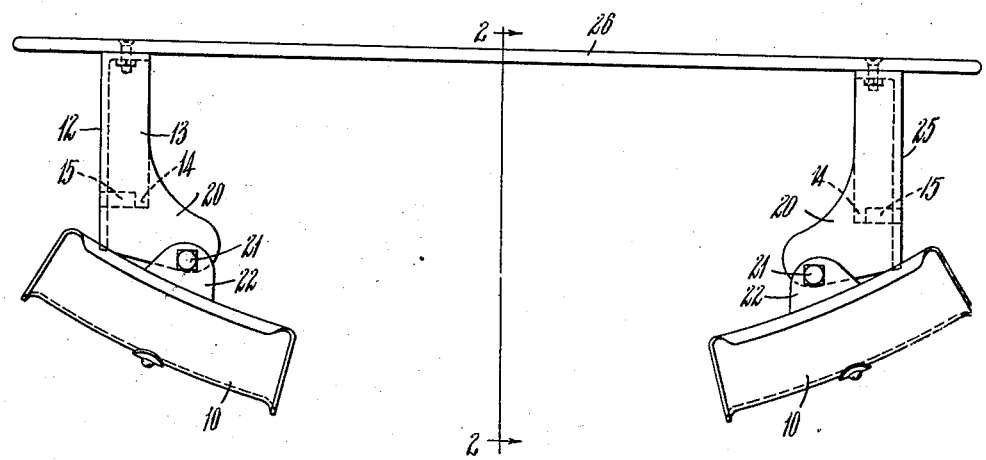
Figure 1 is a rear elevation of our improved trunk rack consisting of two trunk rack brackets connected together by a platform member, the tire holders being attached thereto.
Figure 2:
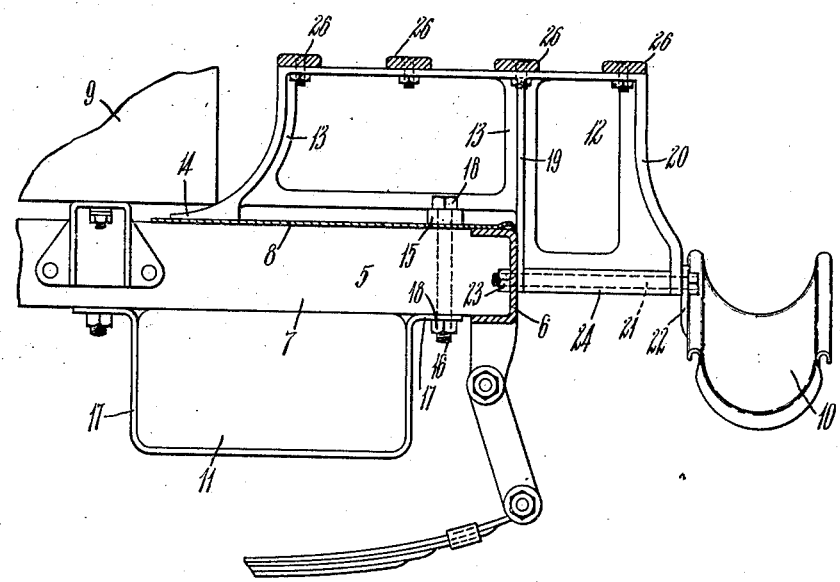
Fig. 2 is a sectional elevation taken on line 2—2, Figure 1, between the two trunk rack brackets and illustrating the same attached to the rear end portion of a chassis of an automobile, with a tire holder attached thereto.

In the drawings, 5 is the rear end portion of the chassis of an automobile. 6 is a channel-shaped cross beam connecting the side frames 7 together at the rear ends thereof. A plate 8 is supported upon and fastened to the chassis 5. 9 is a portion of the body of the automobile. 10 is a tire holder. 11 is a gasoline tank. All of the parts hereinbefore mentioned are a portion of the standard equipment of an Essex automobile.

12 is a trunk rack bracket of our invention, the same consisting of a vertical frame 13 provided at the forward end thereof with a wedge-shaped foot 14 which rests upon the plate 8 immediately above the side member 7 and is wedged in between the chassis frame, of which the plate 8 forms in effect a part, and the underside of the automobile body 9.

An ear 15 projects laterally inwardly from the frame 13 the under faces of said ear 15 and foot 14 both lying in approximately the same horizontal plane and adapted to rest upon one of the side frames 7 of the automobile chassis and a bolt 16 extends downwardly through the ear 15, through the chassis side frame 7 and through a band 17 on the tank 11. The bolt 16, with its nut 18, is a part of the standard equipment of the Essex car and serves the purpose of attaching the tank to the side frame of the chassis. The same bolt in the same location serves to also fasten the trunk bracket of our invention to the chassis of the automobile.

The frame 13 is provided with a pair of inwardly extending vertical ribs or flanges 19 and 20 adjacent the rear end of the trunk rack bracket. These flanges are spaced apart and a bolt 21 extends through both of them and through the channel cross beam 6 and through a bracket 22 on the tire holder 10, thus the bolt 21 and its nut 23 serve as a means for clamping the flange 19 to the rear face of the channel cross beam 6 and also the tire support 10 to the rearmost flange 20 of the trunk rack bracket, and a pipe or sleeve 24 surrounds the bolt 21 between the flanges 19 and 20. The trunk rack bracket 25 is a duplicate of the trunk rack bracket 12, except one is a right and the other is a left, and these two brackets are joined together by slats 26 forming, as a whole, a platform member, upon which the trunks or baggage of any kind may be placed and fastened thereto.

It will be understood that the bolts 21 and pipes or sleeves 24 are also a part of the standard equipment of the Essex automobile, whereby the tire holders 10 may be supported from the channel-shaped cross beam 6 of the chassis frame.

We claim:

1. A trunk rack bracket embodying a vertical frame adapted to be positioned upon the rear end of an automobile chassis, a foot extending forwardly therefrom and adapted to project beneath and contact with the body of said automobile, a vertical flange projecting laterally from the rear portion of said bracket, and means to clamp said flange to the rear face of the rear cross beam of an automobile chassis.

2. A trunk rack bracket embodying a vertical frame adapted to be positioned upon the rear end of an automobile chassis, a foot extending forwardly therefrom and adapted to project beneath and contact with the body of said automobile, a vertical flange projecting laterally from the rear portion of said bracket, and a bolt adapted to extend through said flange and through the cross beam of an automobile chassis whereby said bracket may be clamped to the rear face of said cross beam.

3. A trunk rack bracket embodying a vertical frame adapted to be positioned upon the rear end of an automobile chassis, a foot extending forwardly therefrom and adapted to project beneath and contact with the body of said automobile, an ear projecting laterally from said frame, whereby said bracket may be fastened to said chassis, a pair of flanges spaced apart and projecting laterally from said frame adjacent the rear end thereof and a bolt extending through said flanges, whereby a tire holder may be clamped to the rearmost flange of the two.

4. A trunk rack bracket embodying a vertical frame adapted to be positioned upon the rear end of an automobile chassis, a foot extending forwardly therefrom and adapted to project beneath and contact with the body of said automobile, an ear projecting laterally from said frame, whereby said bracket may be fastened to said chassis, a pair of flanges spaced apart and projecting laterally from said frame adjacent the rear end thereof and a bolt extending through said flanges and positioned to extend through the rear cross beam of said chassis, whereby said bracket may be fastened to said chassis.

5. A trunk rack bracket embodying a vertical frame adapted to be positioned upon the rear end of an automobile chassis, a foot extending forwardly therefrom and adapted to project beneath and contact with the body of said automobile, an ear projecting laterally from said frame, whereby said bracket may be fastened to said chassis, a pair of flanges spaced apart and projecting laterally from said frame adjacent the rear end thereof and a bolt extending through said flanges and positioned to extend through the rear cross beam of said chassis, whereby said bracket may be fastened to said chassis and a tire holder may be clamped to the rear flange of the two.

6. A trunk rack bracket embodying a vertical frame adapted to be positioned upon the rear end of an automobile chassis, a foot extending forwardly therefrom and adapted to project beneath and contact with the body of said automobile, an ear projecting laterally from said frame and a vertical flange projecting laterally from the rear portion of said bracket, and means to fasten said flange to the rear face of the cross beam of an automobile chassis and means to fasten said ear to said chassis.

7. A trunk rack bracket embodying a vertical frame adapted to be positioned upon the rear end of an automobile chassis, a foot extending forwardly therefrom and adapted to project beneath and contact with the body of said automobile, a pair of vertical flanges projecting laterally from the rear portion of said bracket, means to clamp one of said flanges to the rear face of the rear cross beam of an automobile chassis, and means to clamp a tire holder to the other flange of the two.

In testimony whereof we have hereunto set our hands in presence of two subscribing witnesses.

HAROLD M. BATER.
CLARENCE A. GLENTWORTH.

Witnesses:
HARRY P. NOURSE,
BENJAMIN R. VAUGHAN.